United States Patent
Thevenet

(10) Patent No.: US 8,258,218 B2
(45) Date of Patent: Sep. 4, 2012

(54) METHOD OF FABRICATING AN ELECTRIC INSULATOR WITH A POLYMER HOUSING CONTAINING ANTIOZONANTS

(75) Inventor: Guy Thevenet, Beaumont les Randan (FR)

(73) Assignee: Sediver Societe Europeenne d'Isolateurs en Verre et Composite, Nanterre (FR)

( * ) Notice: Subject to any disclaimer, the term of this patent is extended or adjusted under 35 U.S.C. 154(b) by 330 days.

(21) Appl. No.: 12/515,644

(22) PCT Filed: Feb. 13, 2009

(86) PCT No.: PCT/FR2009/050234
§ 371 (c)(1),
(2), (4) Date: May 20, 2009

(87) PCT Pub. No.: WO2009/103923
PCT Pub. Date: Aug. 27, 2009

(65) Prior Publication Data
US 2011/0071242 A1    Mar. 24, 2011

Related U.S. Application Data

(60) Provisional application No. 61/030,059, filed on Feb. 20, 2008.

(51) Int. Cl.
*C08K 5/17* (2006.01)

(52) U.S. Cl. .......................................... 524/254; 524/82
(58) Field of Classification Search .................... 524/588
See application file for complete search history.

(56) References Cited

U.S. PATENT DOCUMENTS

| 2,973,335 | A | * | 2/1961 | Stasiunas | 524/83 |
|---|---|---|---|---|---|
| 3,032,520 | A | * | 5/1962 | Shaw | 524/87 |
| 3,329,645 | A | * | 7/1967 | Childers | 524/102 |
| 4,234,441 | A | * | 11/1980 | Scott et al. | 252/78.3 |
| 4,681,691 | A | * | 7/1987 | Schriver, Jr. | 508/100 |
| 4,808,643 | A | * | 2/1989 | Lemoine et al. | 524/87 |
| 5,346,760 | A | * | 9/1994 | Lemoine et al. | 428/331 |
| 5,486,298 | A | * | 1/1996 | Aso et al. | 252/8.81 |
| 5,835,838 | A | * | 11/1998 | Yu | 399/350 |
| 6,232,376 | B1 | * | 5/2001 | Tsukada et al. | 524/99 |
| 2003/0008955 | A1 | * | 1/2003 | Kleyer et al. | 524/268 |
| 2005/0154132 | A1 | * | 7/2005 | Hakuta et al. | 525/105 |

* cited by examiner

*Primary Examiner* — Robert S Loewe
(74) *Attorney, Agent, or Firm* — Rothwell, Figg, Ernst & Manbeck, P.C.

(57) ABSTRACT

A method of fabricating a composite insulator with a protective housing made of a polymer material incorporating an antioxidant and an antiozonant includes the step consisting in incorporating said antiozonant at a final concentration by weight lying in the range 0.005% to 1%, and said antioxidant at a final concentration by weight lying in the range 0.005% to 1%, said antiozonant being selected from the family of phenylenediamines, and said antioxidant being selected from the family of multifunctional phenolic antioxidants.

5 Claims, No Drawings

METHOD OF FABRICATING AN ELECTRIC INSULATOR WITH A POLYMER HOUSING CONTAINING ANTIOZONANTS

CROSS-REFERENCE TO RELATED APPLICATIONS

This application is a 35 U.S.C. §371 National Phase Application from PCT/FR2009/050234, filed Feb. 13, 2009, and designating the United States, which claims the benefit of U.S. Provisional Application No. 61/030,059, filed Feb. 20, 2008.

BACKGROUND OF THE INVENTION

1. Field of the Invention

The invention relates to a method of fabricating a composite insulator having a protective housing made of polymer materials incorporating an antiozonant and an antioxidant.

2. Discussion of the Background Art

The housing of electric insulators made of composite materials and used either as line insulators or substation insulators, or else for other electrical equipment, is generally made of polymer or elastomer materials such as silicone, ethylene propylene diene monomer (EPDM), ethylene propylene monomer (EPM), or other suitable materials. To simplify, these polymer or elastomer materials are referred to below as "polymer material".

Such an insulator is used in electricity networks or in high voltage equipment. It is more particularly intended for installing in the open end where it is subjected to attack from the surroundings. Under certain environmental conditions, the surface of the polymer material housing changes and affects the performance of the insulator.

Analyses performed firstly on insulators taken from lines, and secondly in the laboratory on samples of polymer materials subjected to electric activity, show that this change is caused by the surface of the polymer material housing being attacked by ozone and by nitric acid.

This change to the surface of the housing is a direct consequence of the electrical activity of the surface under outdoor conditions that favor such change: the ozone is generated by electric discharge into the surrounding air, and the ozone reacting with the nitrogen, the oxygen, and the moisture of the air lead to nitric acid being formed.

Document WO 91/06106 presents a composite insulator that may be covered in a housing for protecting it against the effects of the surroundings, including ozone attack.

Document U.S. Pat. No. 4,638,026 discloses stabilizing polymer materials by using antioxidant agents from the family of of phenolic antioxidants and antiozonant agents from the family of phenylenediamines. Such agents may be used for example in the automobile field for protecting the material constituting tires.

In the field of composite material electric insulators, document US 2005/0209384 discloses a method of treating an electric insulator by covering its surface with a silicone elastomer housing in order to protect it from the outside environment. Nevertheless, no specific mention is made of providing anti-ozone protection for the surface of the housing.

SUMMARY OF THE INVENTION

The object of the invention is to provide a method of fabricating an electric insulator that withstands aggression from ozone caused by the outside environment.

To this end, the invention provides a method of fabricating a composite insulator with a protective housing made of a polymer material incorporating an antioxidant and an antiozonant, the method being characterized in that it includes the step consisting in incorporating in said polymer material said antiozonant at a final concentration by weight lying in the range 0.005% to 1%, and said antioxidant at a final concentration by weight lying in the range 0.005% to 1%, said antiozonant being selected from the family of phenylenediamines, and said antioxidant being selected from the family of multifunctional phenolic antioxidants.

With the method of the invention, laboratory tests have shown that by incorporating and distributing such an antioxidant additive of the multifunctional phenolic antioxidant family at a final concentration by weight lying in the range 0.005% to 1%, together with such an antiozonant additive of the phenylenediamine family at a final concentration by weight lying in the range 0.005% to 1% in a polymer material, a beneficial effect is obtained on the ability of the surface of the polymer material under consideration to withstand degradation. These concentrations are designated below by the term "optimum concentration".

The quantity of additives to be incorporated needs to be controlled, in particular concerning antiozonants, since a high final concentration (more than 1%) of incorporated antiozonant in a polymer material prior to vulcanization impedes total vulcanization of the polymer material and thus harms its performance.

For example, by selecting silicone as the polymer material, beneficial effects on the ability of its surface to withstand degradation have been obtained with about 0.05% antioxidant and about 0.1% antiozonant incorporated in the silicone.

The above-mentioned additives may be incorporated in the bulk of the polymer material making up the housing of an electric insulator by various methods that take place either before (first method) or after (second method) vulcanization of the polymer material.

In a first method by impregnation, the parts for treating, i.e. composite insulators covered in a housing of polymer material, are immersed for a long duration, e.g. about 24 hours, in a solvent (e.g. n-hexane) containing antioxidant and antiozonant additives selected from the above-mentioned families, in respective optimum concentrations as mentioned above. In the presence of the solvent, the polymer material swells, thereby enabling the solvent and the additives to penetrate uniformly into the polymer material. The treated parts are subsequently dried in open air or stoved to eliminate the solvent that has penetrated into the polymer material, while leaving the additives in the polymer material. This produces a composite insulator covered in a housing of polymer material containing antioxidant and antiozonant additives that are distributed uniformly throughout the housing.

In a second method by incorporation, said antioxidant and antiozonant additives are incorporated at respective optimum concentrations in the polymer material during fabrication and prior to vulcanization of the polymer material itself.

For low final concentrations of antioxidant and antiozonant additives, e.g. 0.05%, it can be difficult to obtain a uniform distribution or dispersion of said additives in the matrix of the polymer material, and the time required for obtaining a mixture is long.

In order to ensure uniform dispersion of said additives throughout the polymer material, even at low final concentrations of the additives, a variant of the second method by incorporation can be used. In this variant, a "master batch" is made of the polymer material, the master batch having the same composition as the final polymer material but having added thereto antioxidant and antiozonant additives at concentrations greater than their final optimum concentration. Subsequently, while the polymer material is being fabricated, the master batch can be incorporated therein in proportions that enable the respective optimum concentrations of the antioxidant and antiozonant additives to be obtained. This variant of the second method by incorporation makes it possible to obtain a polymer material with a uniform dispersion of said additive in the matrix of the polymer material.

In particular, it is possible to select a concentration for the antioxidant and antiozonant additives in the master batch that is ten times greater than the final optimum concentration. Under such circumstances, during incorporation, the quantity of polymer material is 90% and the quantity of master batch is 10%.

The invention claimed is:

1. A method of fabricating a composite insulator used in high voltage equipment, the composite insulator having a protective housing made of silicone material incorporating an antioxidant and an antiozonant, the method comprising incorporating in said silicone material said antiozonant at a final concentration by weight of about 0.1%, and said antioxidant at a final concentration by weight of about 0.05%, said antiozonant being selected from the family of phenylenediamines, and said antioxidant being selected from the family of multifunctional phenolic antioxidants.

2. A method of fabricating a composite insulator according to claim 1, wherein the incorporation step includes immersing said composite insulator together with said housing in a solvent containing said antioxidant and said antiozonant for a period of about 24 hours.

3. A method of fabricating a composite insulator according to claim 1, further comprising vulcanizing said silicone material, and wherein the incorporation step is performed prior to said vulcanizing step.

4. A method of fabricating a composite insulator according to claim 3, wherein the incorporation step comprises making a first batch of silicone material with said antioxidant and said antiozonant at respective high concentrations by weight, and then incorporating the first batch in the silicone material in order to obtain said silicone material for said housing incorporating said antioxidant and said antiozonant.

5. A method of fabricating a composite insulator according to claim 4, wherein said high concentration by weight is about ten times the final concentration of said antioxidant and said antiozonant in the silicone material of said housing.

* * * * *